United States Patent
Jain et al.

(10) Patent No.: US 7,477,948 B1
(45) Date of Patent: Jan. 13, 2009

(54) APPARATUS AND METHODS FOR PRECOMPILING PROGRAM SEQUENCES FOR WAFER PROCESSING

(75) Inventors: Jaideep Jain, San Jose, CA (US); Qiang Zhou, Milpitas, CA (US); Steve Kleinke, Menominee, MI (US)

(73) Assignee: Novellus Systems, Inc., San Jose, CA (US)

( * ) Notice: Subject to any disclaimer, the term of this patent is extended or adjusted under 35 U.S.C. 154(b) by 257 days.

(21) Appl. No.: 11/556,989

(22) Filed: Nov. 6, 2006

(51) Int. Cl.
*G05B 15/02* (2006.01)
(52) U.S. Cl. .......................................... 700/9
(58) Field of Classification Search .............. 700/2, 700/3, 8, 9
See application file for complete search history.

(56) References Cited

U.S. PATENT DOCUMENTS

| | | | | |
|---|---|---|---|---|
| 4,276,594 A * | 6/1981 | Morley | ........................ | 713/600 |
| 7,113,838 B2 | 9/2006 | Funk et al. | | |
| 7,190,124 B2 * | 3/2007 | Kumar et al. | ............... | 315/224 |
| 7,257,457 B2 | 8/2007 | Imai et al. | | |
| 2002/0042694 A1 | 4/2002 | Henry et al. | | |
| 2004/0091135 A1 | 5/2004 | Bourg et al. | | |
| 2004/0267399 A1 | 12/2004 | Funk | | |
| 2005/0143952 A1 | 6/2005 | Tomoyasu et al. | | |
| 2006/0212163 A1 * | 9/2006 | Ko et al. | ....................... | 700/213 |

* cited by examiner

*Primary Examiner*—Albrt DeCady
*Assistant Examiner*—Chad Rapp
(74) *Attorney, Agent, or Firm*—Weaver Austin Villeneuve & Sampson LLP

(57) ABSTRACT

Disclosed are apparatus and methods for embodiments for efficiently and flexibly controlling hardware devices in a semiconductor processing system are provided for use in a distributed control arrangement. In general, the distributed arrangement includes at least one upper-level controller that is configurable with a computer program sequence of instructions for controlling one or more hardware devices of a processing tool. The hardware devices are controlled through one or more lower-level controllers. Prior to execution of the program sequence of the upper-level controller, at least one instruction of this program is pre-compiled so as to translate the instruction for execution by a selected lower-level controller and to add an at least one interlock check to such pre-compiled instruction and make the translated instruction accessible to at least one lower-level controller. The interlock check specifies one or more condition(s) for the selected lower-level controller to execute the pre-compiled instruction. Any number of instructions of the upper-level controller may be translated for use by any number of selected lower-level controllers, where some of the translated instructions include one or more interlock checks.

24 Claims, 5 Drawing Sheets

APPARATUS AND METHODS FOR PRECOMPILING PROGRAM SEQUENCES FOR WAFER PROCESSING

BACKGROUND OF THE INVENTION

The present invention relates generally to processing of semiconductor wafers in a plurality of processing systems. More specifically, it relates to computer programs for controlling the operation of devices in such processing systems.

Generally, the industry of semiconductor manufacturing involves highly complex techniques for fabricating integrating circuits from semiconductor materials that are layered and patterned onto a substrate, such as silicon, by various process systems. For example, a first process system deposits a layer of material, while another process system etches a pattern in such deposited material.

In certain systems, a distributed control system is used to control various hardware components in a process system. In one example, a module controller is configured with high level software that, upon execution, operates to communicate with a plurality of underlying hardware I/O controllers (IOC's) to thereby control various hardware components, such as valves and gas flow controllers. The software of a module controller includes a sequence of operations for issuing commands to IOC's and receiving feedback from such IOC's. During execution of the module controller sequence, one or more commands may be issued to a particular IOC, which then sends one or more control signals to one or more hardware components. After issuance of a particular command or set of commands to an IOC, this module controller software typically waits for feedback from the respective IOC before issuing a subsequent command (or set of commands) to the same or a different IOC. The time duration between a command issuance event and receipt of feedback at the module controller level can be significant under certain conditions. To save time, some distributed systems may distribute particular critical sequence portions so that they are implemented directly or "hardcoded" in the appropriate IOC. However, a hardcoded solution does not allow a high level deterministic approach for verifying feedback prior to executing a next command, for example, and the hardcode can be difficult and time consuming to modify.

Accordingly, it would be beneficial to provide improved mechanisms for efficiently and flexibly controlling hardware devices of a processing system while providing full determinism capability.

SUMMARY OF THE INVENTION

Apparatus and method embodiments for efficiently and flexibly controlling hardware devices in a semiconductor processing system are provided for use in a distributed control arrangement. In general, the distributed arrangement includes at least one upper-level controller that is configurable with a computer program sequence of instructions for controlling one or more hardware devices of a processing tool. The hardware devices are controlled through one or more lower-level controllers. Prior to execution of the program sequence of the upper-level controller, at least one instruction of this program is pre-compiled so as to translate the instruction for execution by a selected lower-level controller and to add an at least one interlock check to such pre-compiled instruction and make the translated instruction accessible to at least one lower-level controller. The interlock check specifies one or more condition(s) for the selected lower-level controller to execute the pre-compiled instruction. Any number of instructions of the upper-level controller may be translated for use by any number of selected lower-level controllers, where some of the translated instructions include one or more interlock checks.

In certain embodiments, operation of the hardware devices that are to be controlled by the program sequence and the translated instruction(s) may be simulated so as to verify that such operation is within a predetermined specification. The process for actually controlling the hardware device is then only executed after it has been determined that the simulation results specify that the simulated device operation is within this predetermined specification. Once execution of the program commences, the pre-compiled instructions that have been made accessible to selected lower-level controller(s) provide a very fast solution that has been pre-verified so as to instill confidence that the process control will reliably operate with minimal problems. In further aspects, the translated instructions and their associated interlock checks can also provide real time interlock checking between the various lower-level controllers and their underlying hardware devices to minimize problems associated with the operational interdependencies of the various hardware devices.

In one embodiment, a method of controlling a plurality of hardware devices of a semiconductor processing system via a distributed control system comprising an upper-level controller and a plurality of lower-level controllers coupled with the upper-level controller is disclosed. The method includes the following operations (a) providing a program sequence for the upper-level controller, wherein the program sequence includes a plurality of instructions for controlling one or more of the hardware devices of the processing system via one or more of the lower-level controller(s); (b) translating a selected one of the instructions into a translated set of instructions that include a translation of the selected instruction and one or more interlock checks for determining whether a condition has been met prior to execution of the translated, selected instruction, wherein the translated set of instructions are executable by a selected lower-level controller; (c) making the translated set of instructions accessible to the selected lower-level controller so that the selected lower-level controller can execute the translated set of instructions, including the one or more interlock check(s) and the translated, selected instruction; and (d) initiating execution of a process in the processing system based in part on execution of the translated set of instructions by the selected lower-level controller.

In another embodiment, the invention pertains to a system for controlling a plurality of hardware devices of a semiconductor processing system via a distributed control system comprising an upper-level controller and a plurality of lower-level controllers coupled with the upper-level controller. The system includes an upper-level controller comprising one or more processors and one or more memory. At least one of the processors and memory of the upper-level controller are adapted for (a) providing a program sequence for the upper-level controller, wherein the program sequence includes a plurality of instructions for controlling one or more of the hardware devices of the processing system via one or more of the lower-level controller(s); (b) translating a selected one of the instructions into a translated set of instructions that include a translation of the selected instruction and one or more interlock checks for determining whether a condition has been met prior to execution of the translated, selected instruction, wherein the translated set of instructions are executable by a selected lower-level controller; and (c) making the translated set of instructions accessible to the selected lower-level controller so that the selected lower-level controller can execute the translated set of instructions, including the one or more interlock check(s) and the translated, selected instruction. The system further includes a plurality of lower level controllers coupled with the upper-level controller, each lower-level controller having one or more processors and one or more memory. At least one of the processors and memory of each lower-level controller are adapted for executing one or more translated instructions that are made accessible to such each lower-level controller, including executing any interlock checks associated with such translated instructions.

These and other features and advantages of the present invention will be presented in more detail in the following specification of the invention and the accompanying figures which illustrate by way of example the principles of the invention.

BRIEF DESCRIPTION OF THE DRAWINGS

The present invention is illustrated by way of example, and not by way of limitation.

DETAILED DESCRIPTION OF THE INVENTION

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known procedure operations have not been described in detail in order not to unnecessarily obscure the present invention.

Figure 1:
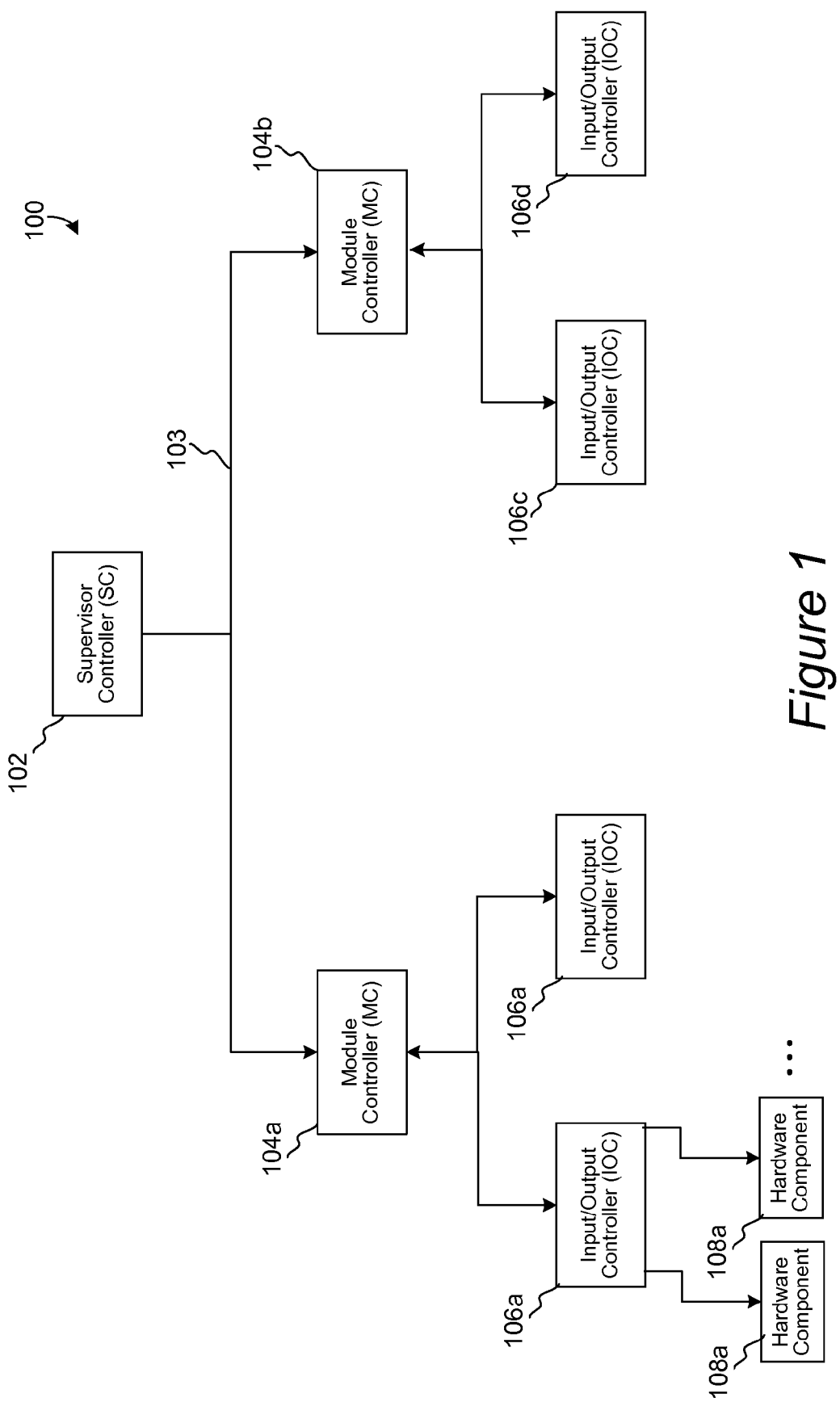
FIG. 1 illustrates one example of a distributed control system in which techniques of the present invention may be implemented.

Embodiments of the present invention are particularly useful in a distributed control system for controlling a plurality of hardware devices of a processing system. Techniques of the present invention may be implemented in any suitable type of distributed control system. FIG. 1 illustrates one example of a distributed control system 100 in which techniques of the present invention may be implemented. As shown, the control system 100 includes a system controller (SC) 102 coupled to two module controllers (MC's) 104a and 104b. Each MC 104 is coupled to its own set of input/output controllers (IOC's) 106a. For example, MC 104a is coupled with IOC's 106a and 106b, while MC 104b is coupled with IOC's 106c and 106d.

Each IOC may also be coupled with one or more hardware device(s) 108 although only shown coupled with IOC 106a.

The SC may be configured to provide an overall control scheme for a processing system. For instance, the SC may include a user interface for a user to interact with the various modules of a processing system. The actual semiconductor process of the processing system may be controlled in discrete modules that are each independently controlled by a separate MC. Accordingly, each MC may include a controlling script for interacting with its various underlying hardware devices (e.g., 108) via one or more IOC's (e.g., 106a and 106b). Each MC's control script may be formed from a number of high level program instructions or instruction sets that are arranged sequentially so as to control the hardware devices of a particular hardware module of the processing system. For instance, a first MC may be configured to control a process module of the processing system, while a second MC may be used to control a front end module (for example a load lock or wafer transfer module).

When an MC is configured with a particular program sequence for controlling the hardware devices of a specific module of the processing system, execution of this sequence may present several problems. Typically, each instruction of the program sequence is interpreted and executed through a series of software layers. A device layer may perform any interlock checks that are needed prior to execution of a particular instruction. An interlock check may include determining whether certain operational conditions of certain hardware device(s) are met prior to execution of a particular program instruction.

In a specific example of the function of various layers of an MC, a user may specify, in a Sequencing Layer of an MC, a particular high level instruction such as OpenValve(vl42), which specifies that a valve identified as "vl42" is to be opened. A Device Layer in the MC may then check to determine whether this instruction can be successfully carried out, e.g., check whether an interlock error prevents this action from occurring, and if such action can occur, determine whether other conditions have to be met before and/or after such instruction. For instance, if a flow is being set, an inlet and outlet valve may need to be opened prior to setting the flow. This interlock checking may involve sending and/or receiving commands to and from various hardware devices. If the Device Layer determines that an instruction can successfully be executed, an I/O Layer may then handle the execution of this instruction by sending a command to the particular hardware, such as "set Do 46 on IOC_1" which specifies that a particular digital output "46" on a particular IOC "IOC_1" is to be set true (e.g., opened).

Unfortunately, interlock checks that are performed at the MC level may require significant time, e.g., to issue commands to particular hardware devices and await responses from such devices for monitoring purposes. In another implementation, prior to execution of the program sequence in the MC, one or more program instructions may be converted into appropriate IOC commands and downloaded to such IOC(s) for fast execution. That is, when the program sequence is executed and the execution reaches a particular instruction having an associated command that was downloaded into a particular IOC, execution of the downloaded command is initiated in the particular IOC. However, although downloading particular instructions of the program sequence as commands to selected IOC's can facilitate a faster execution time for the entire program sequence, interlock checks are lost for such downloaded commands. Accordingly, this technique has attendant risks in that possible processing errors that may occur due to device dependencies may be overlooked prior to initiating operation of a hardware device. Needless to say, a processing error may result in a wafer that cannot be salvaged, resulting in significant costs for an unusable wafer.

Embodiments of the present invention allow efficient execution of a program sequence in a distributed system while maintaining interlock checking. Although these techniques are shown as practiced in the example of FIG. 1, any distributed controller system having at least an upper-level controller and at least one lower-level controller is contemplated herein. In the present example, a pre-compilation procedure includes translating at least some instructions of the program sequence configured in an MC into one or more instructions having a language that is recognizable by the IOC's that will be handling such instructions. Each translated set of IOC instructions may be made accessible to the IOC (e.g., downloaded to the IOC) that will be executing such translated set of IOC instructions.

A translated set of IOC instructions that are produced from a particular MC instruction can include one or more interlock checks if it has been predetermined that one or more interlock checks are needed for the MC instruction being translated. Each IOC is configured with logic capability to handle interlock checks. That is, each interlock check can execute on its IOC so as to ascertain a conditional requirement prior to executing a particular instruction for controlling a hardware device, such as setting a gas flow rate or opening a valve.

In further embodiments, the pre-compilation may include performing a simulation of the interlock checks prior to execution of the program sequence and any actual device operations. For instance, the program sequence results are simulated with respect to the various hardware device and interlock checks are performed during such simulation to verify that operation and interlock dependencies of various hardware are within specification or whether there is an interlock error. Said in another way, pre-compilation may include verifying that there are no safety or device operation violations before execution of the program sequence and any associated, translated instructions. The pre-compilation may perform such interlock check in any suitable manner. In one implementation, device interactions are simulated at various points in the program sequence so as to determine that interlocking safety requirements are met and checked prior to downloading a translated set of IOC instructions to a particular IOC. For instance, if the program sequence initially specifies that a valve_A is to be opened and then specifies that a particular flow is to be set and such flow requires that a different valve (e.g., valve_B) should be opened first, then it will be determined that an interlock violation has occurred for such instruction for setting a flow.

Each IOC may also be configured to provide one or more variables or registers linked to the real-time state of designated hardware devices. These registers would allow real time checking to be performed via inter-IOC communication, e.g., along communication path 103, during execution of a particular semiconductor process. Inter-IOC communication may occur over any suitable communication path and utilize any suitable communication protocol, such as Ethernet. Thus, with this arrangement safety checks may be maintained, even after particular sequence portions are downloaded to their IOC's and thereafter executed during the associated process.

Figure 2:
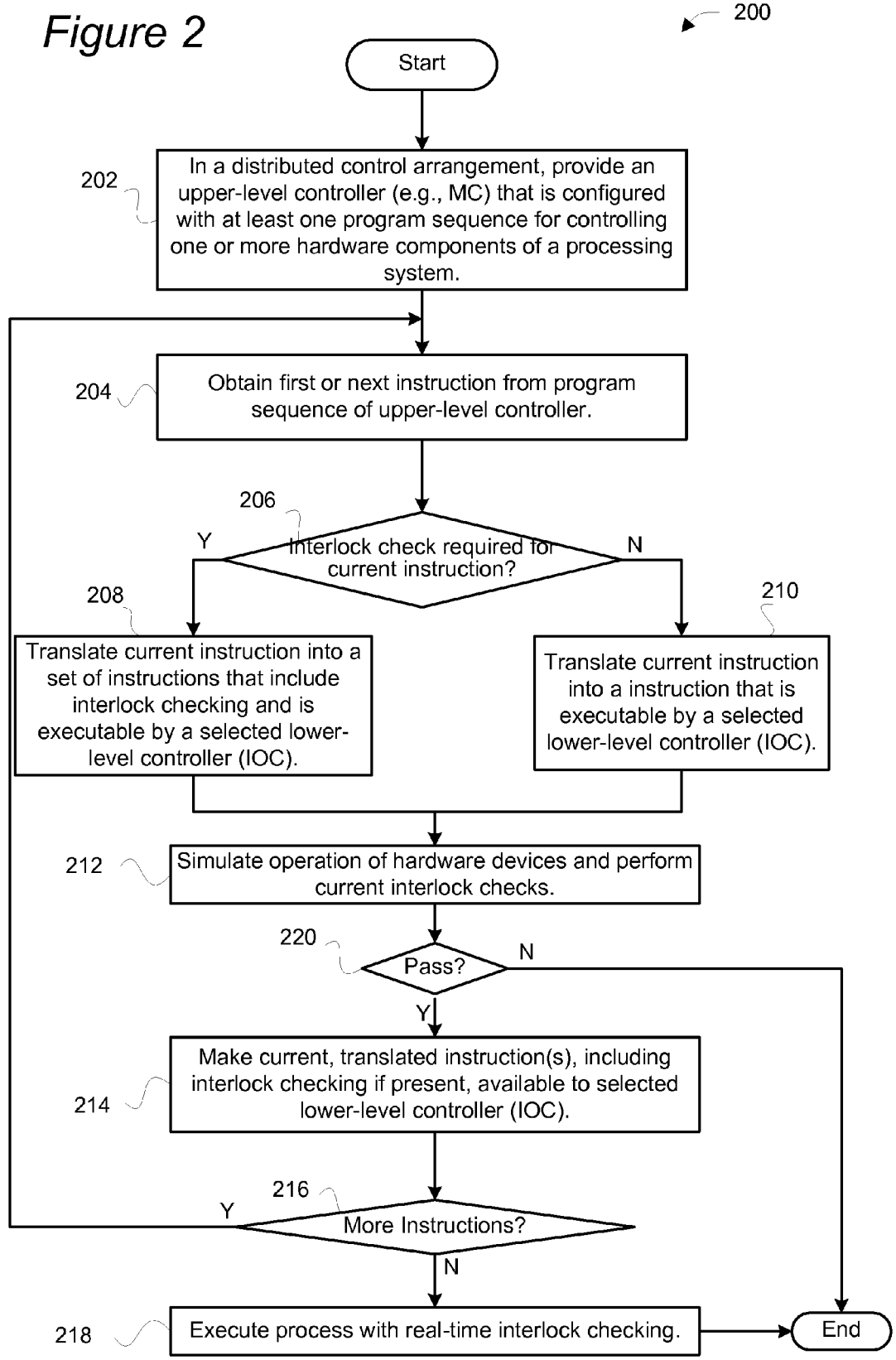
FIG. 2 is a flow chart illustrating a procedure for efficiently controlling hardware devices in a semiconductor processing system while providing interlock checks prior and during execution in accordance with one embodiment of the present invention.
Figure 3:
FIG. 3 illustrates a procedure for translating instructions of a program sequence from an upper-level controller to a set of one or more instructions recognizable by a lower-level controller in accordance with a specific application of the present invention.

FIG. 2 is a flow chart illustrating a procedure 200 for efficiently controlling hardware devices in a semiconductor processing system while providing interlock checks prior and during execution in accordance with one embodiment of the present invention. FIG. 3 illustrates a procedure for translating instructions of a program sequence from an upper-level controller to a set of one or more instructions recognizable by a lower-level controller in accordance with a specific application of the present invention. FIG. 3 will be used to illustrate the operations of the procedure of FIG. 2.

Figure 4:
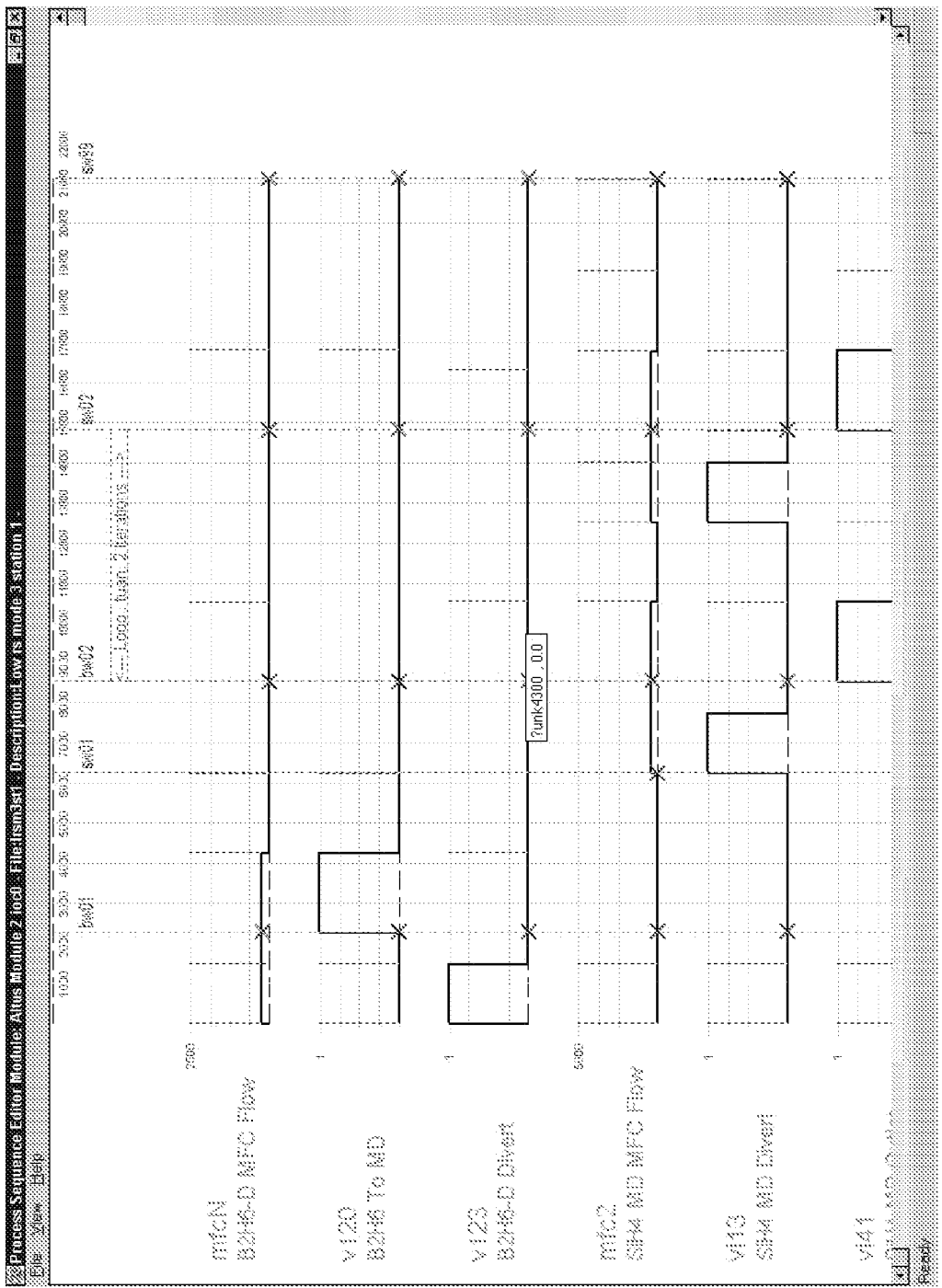
FIG. 4 illustrates a screen shot of a user interface for controlling the hardware devices of a processing system in accordance with one embodiment of the present invention.

As shown in FIG. 2, in a distributed control architecture, an upper-level controller that is configured with at least one program sequence, for controlling one or more hardware components of a processing system, is initially provided in operation 202. For example, the program sequence 302 having steps 1 through 5 of FIG. 3 is provided. The program sequence may be automatically provided or provided by a user. In one implementation, a user interface (UI) allows a user to manipulate and arrange process steps and input parameter values for specific instructions. FIG. 4 illustrates a screen shot of a user interface for controlling the hardware devices of a processing system in accordance with one embodiment of the present invention. This UI includes a graphical representation of various signals that a user may control. For instance, a user may select a particular value of a particular signal of one or more hardware device(s) (e.g., gas flow rate or valve setting of "open" or "closed") during one or more time periods or monitor a particular signal. Alternatively, a user may be presented with selectable blocks of instructions that may be arranged in a particular sequence, such as the sequence 302 of FIG. 3.

The sequence 302 of FIG. 2 includes the following steps: (1) Clamp, (2) Initiate Flows, (3) Set RF (radio frequency) Power, (4) Process, and (5) Shutoff Everything. During a pre-compilation procedure, any portion of the instructions of the program sequence of an upper-level controller may be pre-compiled. In the illustrated example, the pre-compilation results of only the instructions of Step (2) are shown although one or more instructions of any of the other steps may be pre-compiled as well. Additionally, although the procedure of FIG. 2 shows each instruction of the upper-level controller being translated into a set of one or more translated lower-level controller instructions, in practice, only instructions for controlling a hardware device would be translated and made accessible to a lower-level controller.

In the illustrated embodiment, a first instruction is then obtained from the program sequence of the upper-level controller in operation 204. It then may be determined whether an interlock check is required for the currently obtained instruction in operation 206. In the example of FIG. 3, the instructions that require interlock checking are preceded by an "*". If the current instruction does not require an interlock check, the current instruction is then translated into a translated instruction that is executable by a selected lower-level controller (e.g., IOC) in operation 210. The lower-level controller that is specified, by the current instruction, to handle the current instruction is selected. Additionally, the programming language of the upper-level instruction is translated into a second language used by the selected lower-level controller if such language differs from the upper-level language.

As shown in FIG. 3, the instruction "OpenValve (Inlet)" of Step (2) corresponds to the IOC identified by the label IOC_0. Accordingly, this instruction is translated into a translated instruction "Set D0_46/IOC_0" (304a), which translated instruction corresponds to setting the valve identified by signal DO_46 of the IOC_0 to TRUE. Note that the hardware device (Inlet) identified by the untranslated instruction corresponds to signal DO_46 of controller IOC_0, and is, thus, translated into an instruction that specifies the signal DO_46 of the controller IOC_0. In this example, the translated instruction specifies which output signal, DO_46, with respect to the specified IOC_0 to set to a TRUE value. In other words, the particular hardware device specified in the untranslated instruction is mapped to a particular signal (input and/or output) of a particular lower-level controller. The signal may be any suitable format, such as digital input, digital output, analog input, analog output, serial input and/or output, etc.

When it is determined that the current instruction requires an interlock check, the current instruction is then translated into a set of instructions that include the required interlock checking and that is executable by a selected lower-level controller in operation 208. As shown, the instruction "Set-Flow Argon MFC (500)" requires interlock checking and is, accordingly translated into a set of instruction 304b. In this example, the set of translated instructions 304b include step (a) for checking a sensor and step (b) for checking a pressure or flow level prior to initiating the translated instruction in step (c) "Set A0_19/IOC1 1 v" for setting the flow rate of the argon MFC (mass flow controller) to 500. Likewise the untranslated instruction "OpenValve (Outlet)" requires interlock checking and results in a set of translated instructions with interlock checking 304c. The untranslated instruction "Wait for Argon Flow (5% of Setpoint)", on the other hand, does not require interlock checking and is simply translated to translated instruction 304d.

Each lower-level controller is configured to have logic capability to handle interlock checks. For example, each lower-level controller can handle any suitable set of logic constructs that specify a conditional instruction or set of instructions, such as IF-THEN-ELSE, AND, OR, JUMP, LOOP, NEGATE, GOTO, WHILE LOOP, FOR LOOP, WAIT FOR, etc. Accordingly, an interlock check may utilize any suitable type of logic construct that is configured in the selected lower-level controller, such as a conditional instruction or set of instructions.

Translation or pre-compilation is performed on instructions that are to be handled by a lower-level IOC. For instance, only instructions that specify control of one or more hardware devices are translated for handling by a lower-level controller. That is, operations 208 and 210 may be skipped for instructions that are not related to hardware control. An instruction is generally related to hardware control when the instruction specifies a setting for a hardware device characteristic and/or specifies that a characteristic (or signal) of a hardware device is to be monitored. In the present example, the instruction "Wait 30 s" in Step (4) may be left untranslated. In a specific implementation, a user may specify which instructions are to be pre-compiled (e.g., translated and downloaded to a lower-level controller) and pre-compilation is only performed on such specified instructions. For instance, a user adds an indicator (e.g., tag) that indicates translation is to be performed to specific instructions that require pre-compilation.

After an instruction is translated into one or more translated instructions, the operations of the hardware devices may be simulated and the current interlock checks may be performed in operation 212. For instance, the results of executing the program sequence up to this point may be simulated. In the example of FIG. 3, when the current instruction is "Open-Valve (Outlet)" of sequence 302, the device operation states that may results from the previous instructions are simulated. That is, the device states that result from instructions in the Clamp Step (1) (not shown) and the instructions from the preceding instructions of the Initiate Flows Step (2) are simulated. For instance, the Inlet valve, which is equivalent to DO_46 of IOC_0 has been set to true or open. Thus, when it is determined whether interlock checks have passed in operation 220, it may be determined that the single interlock check "Check DI_26 of IOC_0", which corresponds to the Inlet valve is successful since this valve is simulated as open.

If the current interlock checks does not pass, execution of the program sequence and the resulting semiconductor process may be inhibited, e.g., the procedure 200 for pre-compilation ends. Any suitable interlock failure handling may be implemented. For instance, the user may be alerted to the specific interlock failure so she can correct the error in the program sequence. The processing of the wafer is most preferably halted so as to not damage the wafer in a faulty process.

In the illustrated embodiment, each set of interlock checks for the current instruction is verified as passing prior to continuing the procedure 200. Alternatively, the simulated interlock checking may occur at any suitable point during pre-compilation, such as after pre-compilation of all of the instructions of the program sequence.

Referring back to FIG. 2, when the current interlock check is successful, the current, translated instruction(s) are made available to the selected lower-level controller (e.g., IOC) in operation 214. For example, the current, translated instructions are downloaded to the selected IOC. Alternatively, a pointer or memory location to the current, translated instructions may be given to the selected lower-level controller for later access and execution of such translated instruction(s) by the selected lower-level controller.

It may then be determined whether there are more instructions to translate in operation 216. If there are more instructions, the next instruction from the program sequence of the upper-level controller is obtained in operation 204. For example, the next instruction that specifies hardware control or the next instruction that has been flagged for pre-compilation by a user is obtained. The pre-compilation operations 208 through 214 are then repeated for this next instruction and continue to be repeated for each instruction until there are no instructions remaining to pre-compile.

When there are no more instructions remaining to pre-compile, the semiconductor process may then be executed with real-time interlock checking in operation 218. In one implementation, the upper-level controller maintains references to each translated instruction portion that has been made available to selected lower-level controllers. As the upper-level controller executes and interprets each instruction in the program sequence, some of the instructions may be executed directly by the upper-level controller while the selected lower-level controllers execute their own translated instructions and their corresponding interlock checks. For example, the upper-level controller may initiate execution of the translated instructions by sending a signal to each selected lower-level controller for such lower-level controller to execute a particular referenced, translated instruction set.

Additionally, a lower-level controller may include registers or variables having values that are updated in real time based on particular characteristics, e.g., flow rate or valve state, of the lower-level controller. Any number of these variable or registers from any number of lower-level controllers may be accessed by the program sequence of the upper-level controller or by other lower-level controllers for interlock checking, for example, or any other type of monitoring scheme.

Execution of a particular set of translated instructions and associated interlock checks may be carried out by the lower-level controller that has access to such translated instruction set. For example, a same or different lower-level controller or IOC executes each set of translated instructions 304. In one embodiment, the lower-level controller that is selected to execute a particular set of translated instructions is based on which controller is specified in the initial untranslated instruction. For instance, IOC_0 is selected to execute instruction sets 304a and 304c, and IOC_1 is selected to execute instruction set 304b and d.

When a particular translated instruction set includes an interlock check for querying the state of a hardware device of a lower-level controller that has not been selected to handle the particular translated instruction set, the executing lower-level controller may be configured to query the appropriate lower-level controller for the interlock check. For instance, IOC_1 which is executing the translated instruction set 304b sends a query to IOC_0 for the interlock check "Check A1_15/IOC_0>2.6V" of step (b). In one embodiment, each controller has a particular IP (Internet Protocol) address that may be used for such query. The queried lower-level controller then responds with the state of the queried device or with a TRUE/FALSE answer for the interlock check. In the later example of step (b), IOC_0 can respond with the specific voltage of the device that corresponds to the input line Al_15 (e.g., a pressure/flow rate sensor) or respond whether such voltage is greater than 2.6 Volts as specified for the interlock check. Alternatively, a single system lower-level controller may be tasked with execution of all of the translated instructions by initiating execution of each translated instruction or interlock check with the appropriate lower-level controller.

Embodiments of the present invention allow efficient execution of a process in a distributed control system. For example, since the lower-level controllers in some embodiments are tasked with handling interlock checks that are associated with control of their hardware devices, communication time between the upper-level and lower-level controllers are minimized. Additionally, interlock checks can be simulated prior to execution so as to minimize or eliminate interlock errors and thereby increase the reliability of the process. During execution, the lower-level controllers can also maintain interlock checks.

The control techniques of the present invention may be implemented in any suitable combination of software and/or hardware system, such as a semiconductor processing system's processor. Regardless of the system's configuration, it may employ one or more memories or memory modules configured to store data, program instructions for the general-purpose processing operations and/or the inventive techniques described herein. The program instructions may control the operation of an operating system and/or one or more applications, for example. The memory or memories may also be configured to store mappings between identities specified for hardware devices and controllers in a high-level instruction and the corresponding identities used by the lower-level controller, device states, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Embodiments of the present invention employ various processes involving data stored in or transferred through one or more computer systems. Embodiments of the present invention also relate to the apparatus for performing these operations. These apparatus and processes may be employed to set and monitor operating characteristics of one or more components, retrieve stored specifications from databases or other repositories, and compare monitored characteristics to the specifications. The controller apparatus of this invention may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the required method steps.

Figure 5:
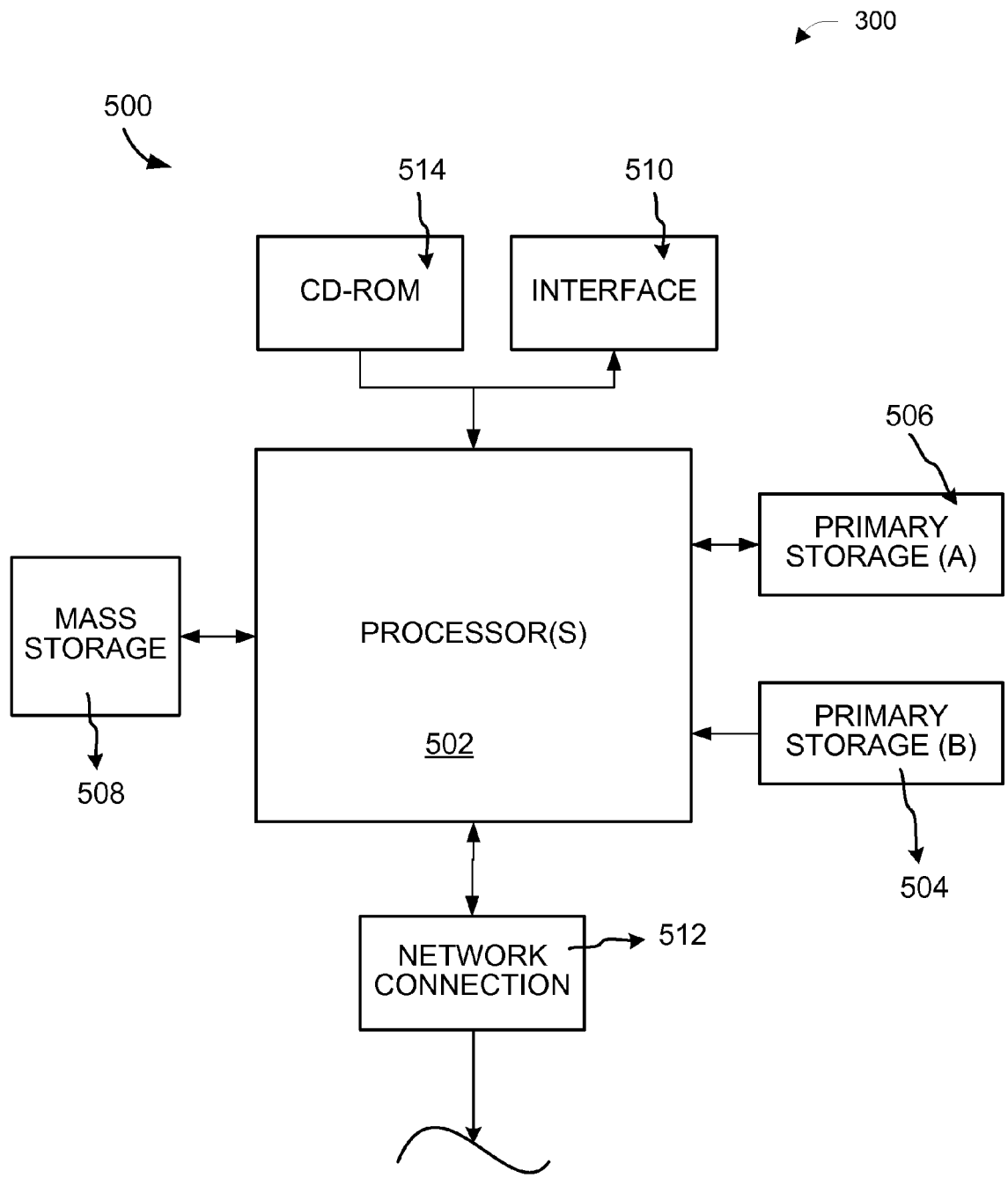
FIG. 5 illustrates a typical computer system that, when appropriately configured or designed, can serve as a controller of this invention.

FIG. 5 illustrates a typical computer system that, when appropriately configured or designed, can serve as a controller (upper or lower-level controller) of this invention. The computer system 500 includes any number of processors 502 (also referred to as central processing units, or CPUs) that are coupled to storage devices including primary storage 506 (typically a random access memory, or RAM), primary storage 504 (typically a read only memory, or ROM). CPU 502 may be of various types including microcontrollers and microprocessors such as programmable devices (e.g., CPLDs and FPGAs) and unprogrammable devices such as gate array ASICs or general purpose microprocessors. As is well known in the art, primary storage 504 acts to transfer data and instructions uni-directionally to the CPU and primary storage 506 is used typically to transfer data and instructions in a bi-directional manner. Both of these primary storage devices may include any suitable computer-readable media such as those described above. A mass storage device 508 is also coupled bi-directionally to CPU 502 and provides additional data storage capacity and may include any of the computer-readable media described above. Mass storage device 508 may be used to store programs, data and the like and is typically a secondary storage medium such as a hard disk. It will be appreciated that the information retained within the mass storage device 508, may, in appropriate cases, be incorporated in standard fashion as part of primary storage 506 as virtual memory. A specific mass storage device such as a CD-ROM 514 may also pass data uni-directionally to the CPU.

CPU 502 is also coupled to an interface 510 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 502 optionally may be coupled to an external device such as a database or a computer or telecommunications network using an external connection as shown generally at 512. With such a connection, it is contemplated that the CPU might receive information from the network, or might output information to the network in the course of performing the method steps described herein.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

What is claimed is:

1. A method of controlling a plurality of hardware devices of a semiconductor processing system via a distributed control system comprising an upper-level controller and a plurality of lower-level controllers coupled with the upper-level controller, the method comprising:
   a) providing a program sequence for the upper-level controller, wherein the program sequence includes a plurality of instructions for controlling one or more of the hardware devices of the processing system via one or more of the lower-level controller(s);
   b) translating a selected one of the instructions into a translated set of instructions that include a translation of the selected instruction and one or more interlock checks for determining whether a condition has been met prior to execution of the translated, selected instruction, wherein the translated set of instructions are executable by a selected lower-level controller;
   c) making the translated set of instructions accessible to the selected lower-level controller so that the selected lower-level controller can execute the translated set of instructions, including the one or more interlock check(s) and the translated, selected instruction; and
   d) initiating execution of a process in the processing system based in part on execution of the translated set of instructions by the selected lower-level controller.

2. A method as recited in claim 1, further comprising repeating steps (b) through (d) for a plurality of instructions of the provided program sequence of the upper-level controller, wherein one or more interlock check(s) are only included in each translated set of instructions when such interlock check(s) are predetermined to be required for execution of the each instruction.

3. A method as recited in claim 2, wherein steps (b) and (c) are only repeated for instructions of the program sequence that specify control of one or more hardware device(s).

4. A method as recited in claim 3, wherein an instruction of the program sequence specifies control of one or more hardware device(s) by having an indicator that indicates that such instruction requires translation.

5. A method as recited in claim 3, wherein at least one of the instructions that specify control of one or more hardware device(s) specify a setting of such one or more hardware device(s).

6. A method as recited in claim 3, wherein at least one of the instructions that specify control of one or more hardware device(s) specify a monitoring of a characteristic of one or more hardware device(s).

7. A method as recited in claim 1, wherein the step of translating includes translating from a first language recognizable by the upper-level controller to a second language recognizable by the selected lower-level controller.

8. A method as recited in claim 2, further comprising:
   simulating operation of the hardware devices based on simulating execution of the program sequence while performing the one or more interlock check(s) for each set of translated instructions to determine whether an interlock check fails; and
   inhibiting initiation of step (d) when an interlock check fails.

9. A method as recited in claim 8, wherein the simulation is performed prior to the step (c) of making the translated set of instructions accessible to the selected one or more lower-level controller and the method further comprising inhibiting or halting the step (c) of making the translated set of instructions accessible when an interlock check fails.

10. A method as recited in claim 1, wherein execution of the process includes real time interlock checking to verify one or more predefined states of the hardware device(s).

11. A system for controlling a plurality of hardware devices of a semiconductor processing system via a distributed control system comprising an upper-level controller and a plurality of lower-level controllers coupled with the upper-level controller, the system comprising:
   an upper-level controller comprising one or more processors and one or more memory, wherein at least one of the processors and memory of the upper-level controller are adapted for:
      a) providing a program sequence for the upper-level controller, wherein the program sequence includes a plurality of instructions for controlling one or more of the hardware devices of the processing system via one or more of the lower-level controller(s);
      b) translating a selected one of the instructions into a translated set of instructions that include a translation of the selected instruction and one or more interlock checks for determining whether a condition has been met prior to execution of the translated, selected instruction, wherein the translated set of instructions are executable by a selected lower-level controller; and
      c) making the translated set of instructions accessible to the selected lower-level controller so that the selected lower-level controller can execute the translated set of instructions, including the one or more interlock check(s) and the translated, selected instruction; and
   a plurality of lower level controllers coupled with the upper-level controller, each lower-level controller comprising one or more processors and one or more memory, wherein at least one of the processors and memory of each lower-level controller are adapted for executing one or more translated instructions that are made accessible to such each lower-level controller, including executing any interlock checks associated with such translated instructions.

12. A system as recited in claim 11, wherein at least one of the processors and memory of the upper-level controller are further adapted for repeating steps (b) through (c) for a plurality of instructions of the provided program sequence of the upper-level controller, wherein one or more interlock check(s) are only included in each translated set of instructions when such interlock check(s) are predetermined to be required for execution of the each instruction.

13. A system as recited in claim 12, wherein steps (b) and (c) are only repeated for instructions of the program sequence that specify control of one or more hardware device(s).

14. A system as recited in claim 13, wherein an instruction of the program sequence specifies control of one or more hardware device(s) by having an indicator that indicates that such instruction requires translation.

15. A system as recited in claim 13, wherein at least one of the instructions that specify control of one or more hardware device(s) specify a setting of such one or more hardware device(s).

16. A system as recited in claim 13, wherein at least one of the instructions that specify control of one or more hardware device(s) specify a monitoring of a characteristic of one or more hardware device(s).

17. A system as recited in claim 11, wherein the step of translating includes translating from a first language recognizable by the upper-level controller to a second language recognizable by the selected lower-level controller.

18. A system as recited in claim 12, wherein the at least one of the processors and memory of the upper-level controller are further adapted for simulating operation of the hardware devices based on simulating execution of the program sequence while performing the one or more interlock check(s) for each set of translated instructions to determine whether an interlock check fails; and inhibiting execution of the translated instruction by the lower-level controller when an interlock check fails.

19. A system as recited in claim 18, wherein the simulation is performed prior to the step (c) of making the translated set of instructions accessible to the selected one or more lower-level controller and the method further comprising inhibiting or halting the step (c) of making the translated set of instructions accessible when an interlock check fails.

20. A system as recited in claim 18, wherein the at least one of the processors and memory of the upper-level controller are further adapted for initiating a semiconductor process on a wafer based on the program sequence and the translated instructions and inhibiting the semiconductor process when an interlock check fails.

21. A system as recited in claim 11, wherein the at least one of the processors and memory of the upper-level controller are further adapted for initiating a semiconductor process on a wafer based on execution of the program sequence by the upper-level controller and execution of the translated instructions by one or more lower-level controllers, and wherein the process includes real time interlock checking to verify one or more predefined states of the hardware device(s).

22. A system as recited in claim 21, wherein the at least one of the processors and memory of each lower-level controller is further adapted to provide one or more registers that are updated with an operating characteristic of the each lower-level controller.

23. A system as recited in claim 22, wherein at least one the interlock check executed by at least one of the lower-level controllers includes analyzing a selected register of a selected other lower-level controller.

24. A system as recited in claim 22, wherein execution of the program sequence by the upper-level controller includes analyzing a selected register of a selected other lower-level controller.

* * * * *